United States Patent [19]

Nelson et al.

[11] Patent Number: 4,725,144
[45] Date of Patent: Feb. 16, 1988

[54] OPTIC ELEMENT TESTING METHOD AND APPARATUS

[75] Inventors: Burke E. Nelson; Marion L. Scott, both of Albuquerque, N. Mex.

[73] Assignee: R & D Associates, Marina Del Rey, Calif.

[21] Appl. No.: 832,972

[22] Filed: Feb. 25, 1986

[51] Int. Cl.$^4$ .............................................. G01B 9/02
[52] U.S. Cl. ...................................... 356/360; 350/607
[58] Field of Search ................. 356/359, 360; 350/607

[56] References Cited

U.S. PATENT DOCUMENTS

| | | |
|---|---|---|
| 3,797,938 | 3/1974 | Heflinger . |
| 3,904,274 | 9/1975 | Feinleib . |
| 3,977,789 | 8/1976 | Hunter . |
| 4,236,821 | 12/1980 | Meyer-Arendt . |
| 4,236,824 | 12/1980 | Anderson . |
| 4,387,966 | 6/1983 | Holly .............................. 350/358 X |
| 4,477,720 | 10/1984 | Pearson . |

FOREIGN PATENT DOCUMENTS 127860 12/1984 European Pat. Off. ............ 350/607

OTHER PUBLICATIONS

Henderson et al., "System Performance of a Large Deformable Mirror Using Differential Ball Screw Actuators", *Proc. Soc. of Photo-Optical Instrum. Engrs.*, vol. 179, pp. 51-60, 1979.

*Primary Examiner*—Davis L. Willis
*Assistant Examiner*—Matthew W. Koren
*Attorney, Agent, or Firm*—Freilich, Hornbaker, Rosen & Fernandez

[57] ABSTRACT

A system is described for testing aspheric optic elements by the interference of light beam components that are respectively directed to the element to be tested and to a reference element, which facilitates the testing. A reference element is deformable in a controlled manner to more closely match the element to be tested, to produce straighter and more even fringes.

22 Claims, 12 Drawing Figures

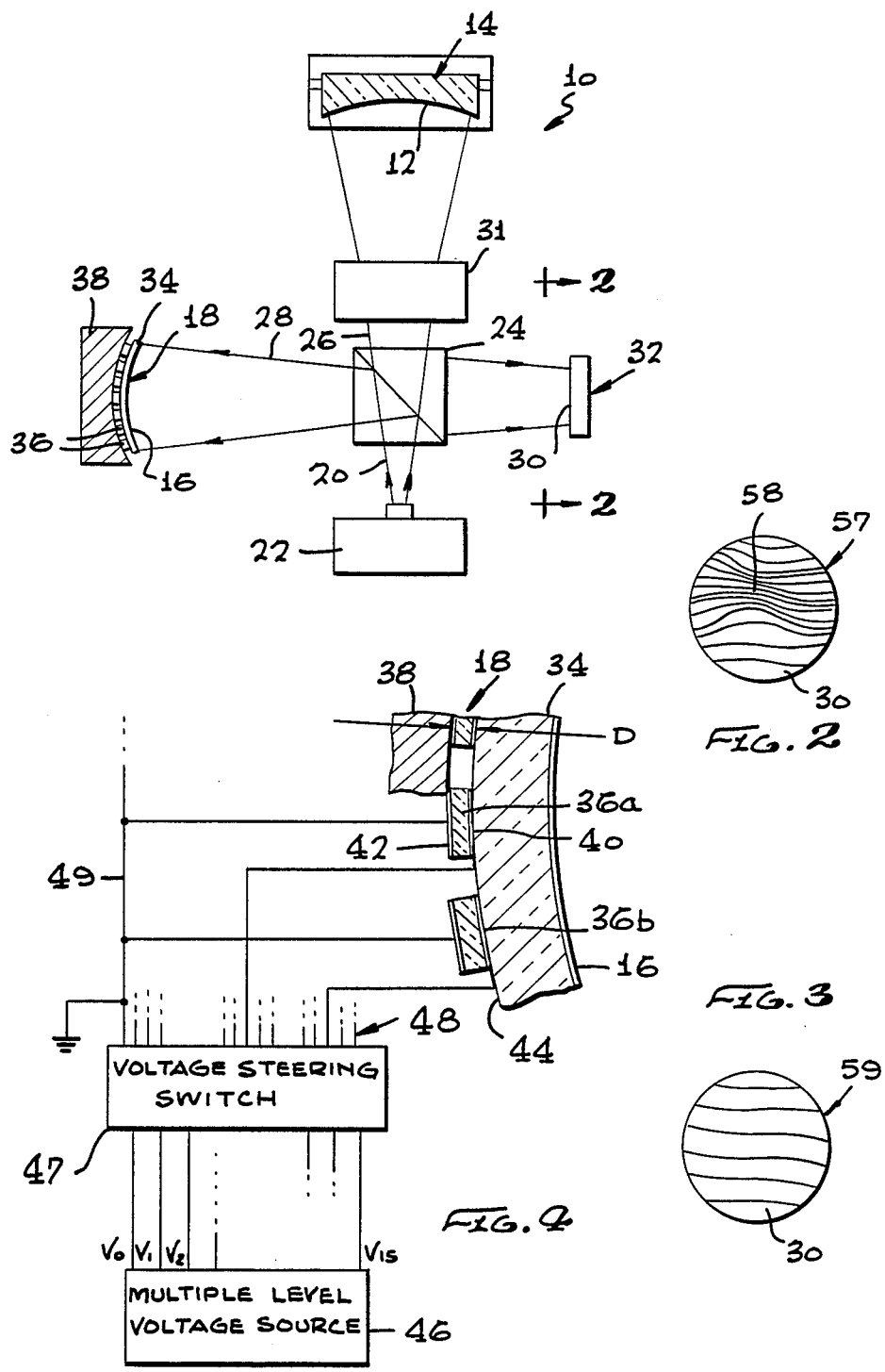

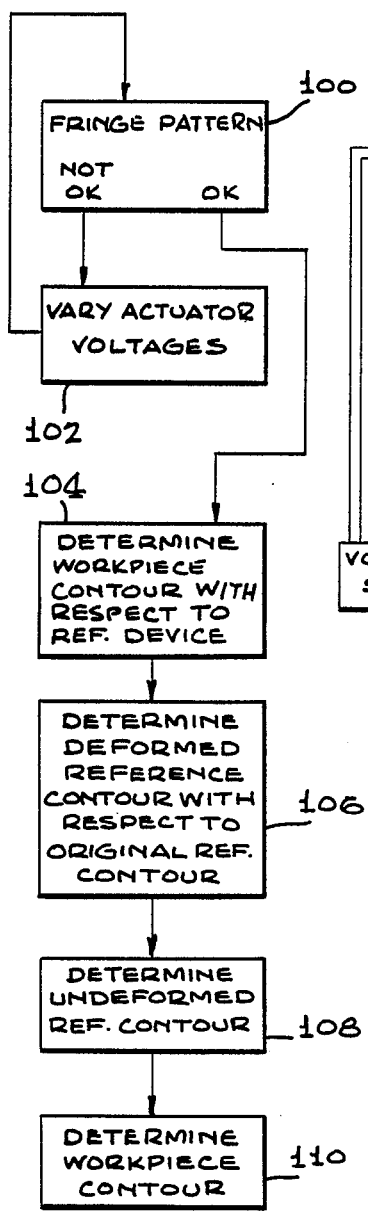
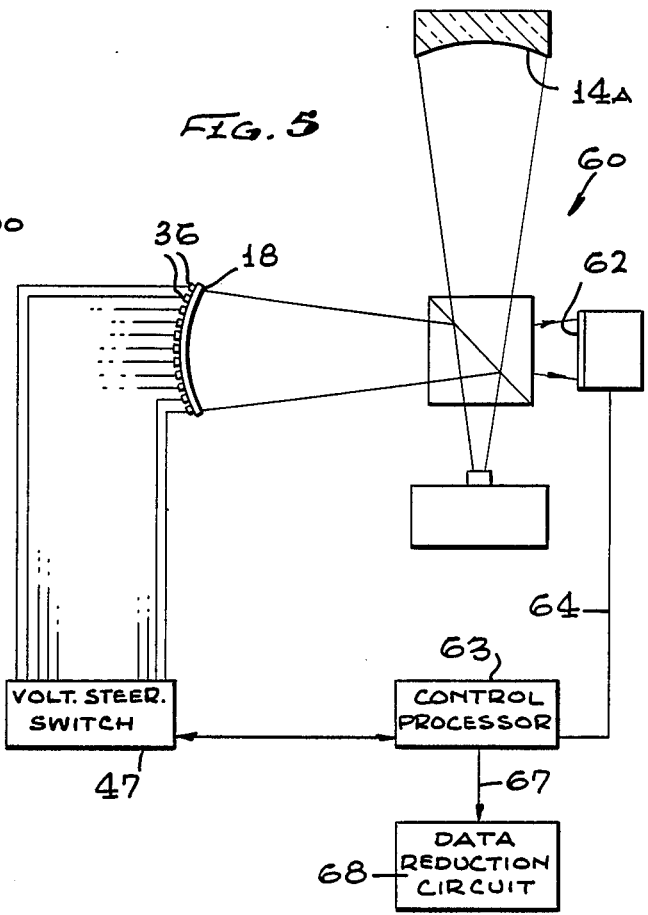
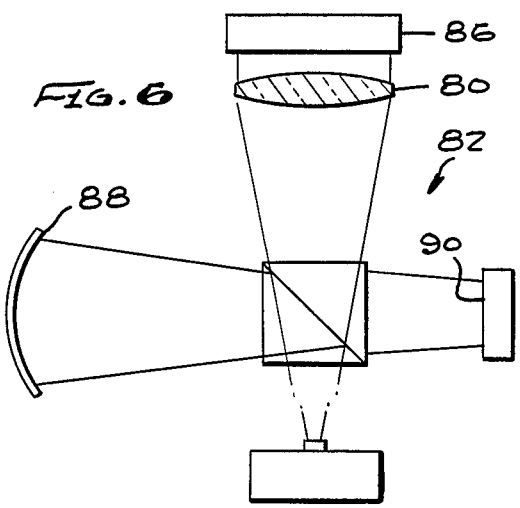

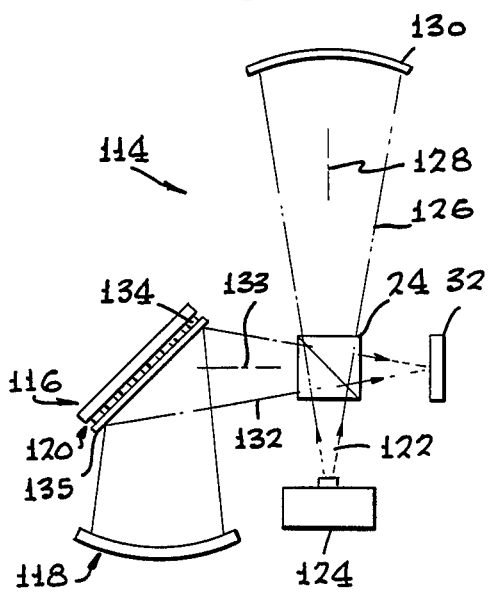
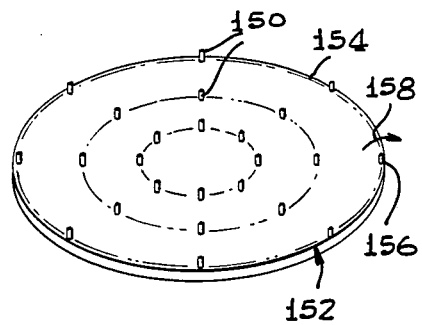
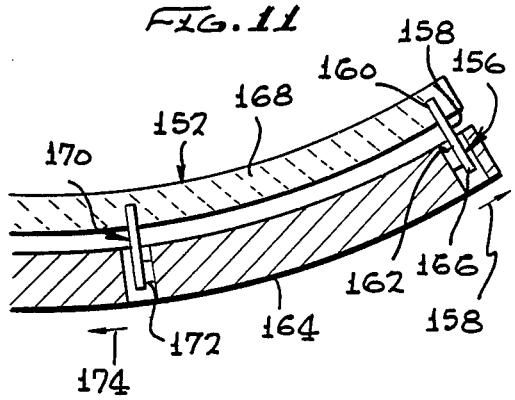
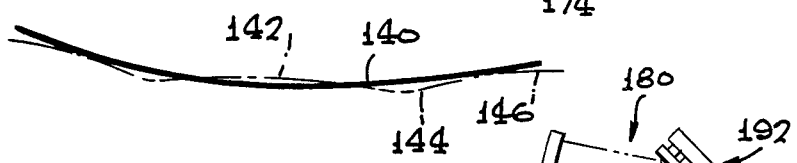
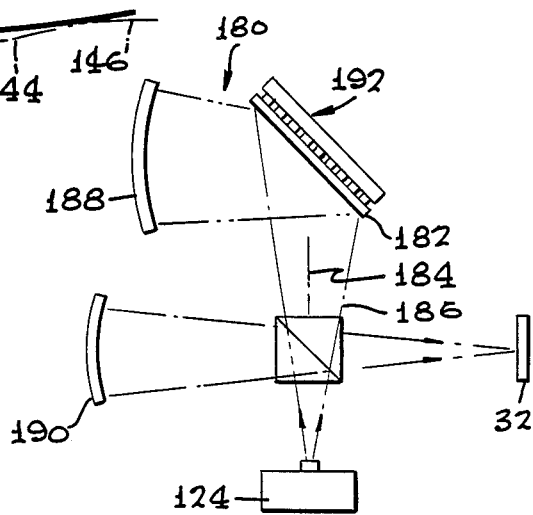

OPTIC ELEMENT TESTING METHOD AND APPARATUS

BACKGROUND OF THE INVENTION

One method which has been used to measure the contour of aspheric optic devices involves the production of fringes by the interference of two components of a coherent light beam, one directed at the optic device to be tested and the other at a reference optic device. One system of this type includes a Twyman-Green interferometer which includes a laser light source, and a reference optic reflector device which matches the reflector optic device to be tested. A beamsplitter directs components of the laser light onto the two devices and then combines the returned components to form a fringe pattern. If the contours of the two reflective devices are close, then a pattern of fringes is produced wherein the fringes are widely spaced and substantially straight, or circular (so-called null fringes) and if there is a moderately small mismatch, then the fringes will be closer together and moderately distorted. If the workpiece device, or device to be tested, has a significant departure from a spherical surface, while the reference device is spherical, then the fringes may be too close and too distorted to be interpreted with any accuracy. If the maximum density of fringe lines is reduced, or the density of a more uniform radius of curvature (i.e., the lines do not vary from almost straight to closely curved), the fringe pattern will be easier to analyze. An approach often used to overcome the limitation is to insert an aspheric null lens (or a series of null lenses) over the test surface to reduce fringe density. This is costly and introduces the errors of the null lenses into the measurement.

SUMMARY OF THE INVENTION

In accordance with one embodiment of the present invention, a method and apparatus are provided for measuring an optical property of an optical device by interferomically comparing it to a reference element, which facilitates such comparison. A coherent light beam is split into two components, that travel along two different paths before they are recombined to produce a fringe pattern. The system includes a deformable optical element (which may be the reference element or another element) located along one of the paths, and means for deforming it so the fringe pattern can be more accurately analyzed.

The novel features of the invention are set forth with particularity in the appended claims. The invention will be best understood from the following description when read in conjunction with the accompanying drawings.

BRIEF DESCRIPTION OF THE DRAWINGS

FIG. 1 is a largely diagrammatic view of a system for measuring characteristics of a workpiece optical device.

FIG. 2 is a view taken on the line 2—2 of FIG. 1 prior to deformation of the reference optic device.

FIG. 3 is a view similar to that of FIG. 2 but showing the fringe pattern after deformation of the reference optical device to more closely match the device to be tested.

FIG. 4 is a sectional view of a portion of the reference optical device of the system of FIG. 1.

FIG. 5 is a view of another system of the invention.

FIG. 6 is a view of another system of the invention.

FIG. 7 is a flow diagram showing a process for determining the contour of a workpiece.

FIG. 8 is a view of another system of the invention.

FIGS. 9-11 are views of another system of the invention.

FIG. 12 is a view of another system of the invention.

DESCRIPTION OF THE PREFERRED EMBODIMENTS

FIG. 1 illustrates a system 10 for measuring the configuration of a reflective surface 12 of an optical device to be tested, or optic workpiece 14. This is accomplished by comparing the surface 12 to the reflective surface 16 of a reference optical device 18. A coherent light beam 20 from a laser 22 is directed at a beamsplitter 24 which divides the beam into two components 26, 28 which initially travel along different paths. One component 26 is directed at the workpiece 14, is reflected from the workpiece surface 12 back towards the beamsplitter, and is deflected by the beamsplitter against a fringe receiving surface 30 on a device 32. The other component 28 is reflected off the surface 16 of the reference device, and returns to the beamsplitter through which it passes to the fringe surface 30. It should be noted that a quarter wave plate and a polarizer/analyser pair, are commonly used in such interference system, but are well known in the art and are not shown here in order to simplify the diagrams to aid in their understanding.

In one case, it is assumed that the two optical devices 14, 18 have identical reflecting surfaces, or geometrically similar surfaces if one of the beams is spread or contracted by a telescope 31. In that case, the fringes on the fringe surface 30 will be all black or all white, or if tilt is introduced for convenience in testing, the fringes will be straight, parallel and separated. However, if the two surfaces are of different contours, then the fringes will have uneven spacing and will generally be curved, with different fringes being curved differently when one of the reflective surfaces is considerably aspheric while the other is spherical. A slight to moderate deviation of the fringe pattern from a series of uniformally spaced parallel fringe lines can be interpreted by an expert to indicate the difference between the reflective surfaces 12, 16 of the two devices. However, if the deviation is very great, then it is very difficult for even an expert to determine the configuration of the workpiece reflective surface. In some prior art systems, the device 30 which contains the fringe receiving surface 32, produces electrical signals indicating the frame pattern, and the signals are processed by a programmed computer to provide a measurement of the curvature of the workpiece device surface relative to the reference device. However, available fringe sensors and computers coupled thereto cannot accurately determine the surface configuration of the workpiece device when the fringes are very close and highly curved.

In accordance with the invention, applicant can reduce the deviation of the fring pattern from a straight line pattern, by deforming the reflective surface 16 of the reference optical device to more closely match the reflective surface 12 of the workpiece device. The reference device 18 includes an optical element 34 coupled through several to perhaps one thousand piezoelectric actuators 36 to a rigid support or mount 38. It should be noted that a variety of actuators are available, including magnetostrictive and mechanical lead screws. Each actuator has a configuration such as shown in FIG. 4, wherein the actuator 36a is shown as having a pair of electrodes 40, 42 on its opposite faces. The actuator face with the electrode 40 thereon is bonded to a rear face 44 of the reference device 18. The opposite face of the actuator at the electrode 42 is bonded to the support 38.

A multiple level voltage source 46 supplies a number of different voltage levels, such as sixteen, to a voltage steering switch 47. The switch 47 has numerous output lines 48 that are each connected to a front electrode 40 of a different one of the numerous actuators. The rear face of each actuator is connected to a grounded line 49. The change in thickness of each piezoelectric actuator 36 depends on the voltage applied between its opposite faces. By selecting the voltage applied on each output line 48, applicant controls the distance D of each small area of the optic device 18 from the support 38. This permits a change in the average spherical curvature or focal length of the reference element, as well as the introduction of a controlled deviation from a spherical surface. All of this is done to more closely match the contour of the reference device surface 16 to the contour of the workpiece device surface 12, so as to obtain a fringe pattern which can be more precisely interpreted.

Telescope systems have been used in the prior art, wherein the portion carrying the reflective surface has been deformable. Such deformation has been used to compensate for aberrations in the image arising from thermal gradients and other causes. Applicant's use of deformable reflective surfaces in systems for measuring the configuration of the surface of an optical device, and especially an aspherical optical device, aids in the manufacture of a wide range of optical devices.

It is practical, in many instances, to operate the system in FIG. 1 by having an expert person manually control each of perhaps one thousand switch devices of the voltage steering switch 47 while he views the fringe pattern on the surface 30. Such varying can continue until either the fringe pattern includes parallel fringe lines, or consists of a pattern which can be accurately interpreted to determine the deviation of the workpiece device from the reference device. FIG. 2 illustrates a type of fringe pattern 57 which is difficult to interpret. By deflecting the reference devices at a location corresponding to the location 58 where there is a high fringe density, the density and curvature of the fringes is reduced. This process may continue until a pattern of the type shown at 59 in FIG. 3 is obtained which can be accurately interpreted. The deviation of contour of the workpiece device from that of the deformed reference device can be determined from the fringe pattern. The deviation of the reference optical device from its original contour is determined by the voltage applied to each actuator. These two deviations can be geometrically added to the known original contour of the reference optic device, to determine the contour of the workpiece optic device. In general, the deflections of piezoelectric actuators at known voltages are very repeatable. The contours of the deformed reference surface can then be defined to an arbitrary level of precision by structural analysis. While an expert person can manually manipulate the switch devices of the steering switch, interpret the fringe pattern (if the fringes are curved and/or unevely spaced), and geometrically add the deviations, this requires considerable time.

FIG. 5 shows a system 60 wherein the fringe receiving surface 62 is photosensitive to generate electrical signals on an output 64 representing the pattern of fringes on the surface 62. The output 64 is delivered to a control processor 63 which controls the voltage steering switch 47 to apply a voltage to each of the actuator elements 36 of the reference optic device 18. The voltages (above zero) are initially applied to each region of the reference device 18 which corresponds to a region on the fringe receiving surface 62 where there is a high density of fringes (e.g., corresponding to location 58 in FIG. 2). The process is iterative to reduce the fringe density and to straighten the fringes. The controller is programmed to generate signals on its output 67 representing the deviation in curvature of the two optic devices 18, 14A, from the fringe pattern and from the deviation of the referece device 18 from its original configuration due to the voltages on each of the numerous actuators. The signals on line 67 representing the deviations are received by a data reduction circuit 68, which geometrically adds the deviations to the original curvature of the reference device to indicate the curvature of the workpiece optic device. A fringe reading system of the type shown in FIG. 5, except it has no controller for varying the contour of the reference device, is available from Zygo Corporation of Middlefield, Connecticut. It is named the Mark III Phase Measuring Interferometer and is used with a computer program from Zygo Corporation named ZAPP (for Zygo Automatic Pattern Processor).

The operation of the control processor 63 is represented by the flow diagram of FIG. 7. In keeping with normal practice, for testing a nominally spherical surface workpiece device, the reference surface is considered initially spherical, and tilt is introduced to produce a series of fringe lines, although the reference could be aspheric and/or null fringes could be employed. A first step in the operation of the control processor is indicated at 100, where it analyzes the fringe pattern to determine whether it is "O.K." or "not O.K." If the spacing of the fringes is at least a certain minimum, and none of the fringes have more than a certain radius of curvature therealong, then the fringe pattern will be "O.K." If the fringe pattern is not "O.K.," then the next step is as indicated at 102, which is to vary the actuator voltages at the locations corresponding to location on the fringe sensor of greatest fringe density and smallest radius of curvature. This continues until the fringe pattern is acceptable.

When the fringe pattern is acceptable, the next step, indicated at 104, is for the control processor to examine the fringe pattern and from that determine the workpiece contour with respect to the reference device. A next step indicated at 106 is for the control processor to examine the pattern of voltages applied to the actuators that deform the reference device to determine the contour of the deformed reference device with respect to the undeformed reference device. A next step indicated at 108 is to determine the undeformed reference contour, with signals representing the undeformed contour having been previously fed into the central processor. A final step indicated at 110 is to determine the workpiece contour from the combination of the three measurements which are the deviation of the devices as determined from the fringe pattern, the deformation of the reference device as determined from the voltages applied, and the original undeformed reference contour. Signals representing the workpiece contour can be delivered to the data reduction circuit 67, where the contour of the workpiece device is displayed, such as on a screen with numerous lines thereon that follow locations of equal elevation above a spherical surface, in addition to a number representing the average focal length or average radius of curvature of the surface of the workpiece device.

Although the measuring system is useful for measuring the contour of reflective surfaces, it can also be used to measure the refractive characteristics of lenses such as lens 80 in FIG. 6. Of course, each surface of an aspheric lens can be measured by determining the contour from reflections from that surface, but it can also be determined by passing light through the lens. In FIG. 6, the system 82 is similar to that of FIG. 1, except that a flat mirror 86 is positioned behind a lens workpiece device 80 so that light passes twice through the lens 80. A reference reflector 88 should have about half the focal length of the lens 80, in order that the fringe pattern on a surface 90 will have fringe lines that are not too curved or too close. Either the reference reflector 88 or the flat reflector 86 (or both) is deformable.

FIG. 8 illustrates another system 114 wherein the reference optical device 116 includes two reflectors 118, 120, with one of them 120 being deformable and the other 118 being nondeformable. In this system, the light 122 from a laser source 124 is split, with one component 126 passing along a test arm or path 128 which includes the workpiece optical device 130 that is to be tested, while the other component 132 passes along the reference path or arm 133 along which the optical element surfaces are known. The electrically controlled actuators 134 which serve as controllable means for deforming the first reflector 120, deform a reflector optical element 135 which is substantially flat. It is generally easier to construct a flat precision optical surface than a curved one, which can reduce the cost of the system.

A common type of deviation of an optical surface from a desired configuration, is the presence of circular or ring-shaped zones that deviate from the desired configuration. Such zones are often introduced into a mirror surface during polishing. FIG. 9 illustrates three common types of deviation of an optical surface from a desired optical surface indicated in solid lines at 140. One common deviation is a hump 142 in the center of the optical surface. Another type is a low band 144 near the half-radius of the surface. Another common type is a roll-off 146 at the edge of the surface. FIG. 10 illustrates one arrangement of actuators 150 for correcting deformations that occur in a circle of a ring-shaped band in an optical element 152. The actuators 150 are arranged substantially along an imaginary ring 154. Each actuator such as 156 applies a moment or torque indicated at 158, to tilt the optic device. FIG. 11 illustrates the actuator 156, which includes a post 158 having an inner end 160 anchored in the optical element 152. The actuator also includes a piezoelectric actuator element 162 mounted on a base 164 and positioned to engage the outer end 166 of the post. The actuator element 162 applies force to the outer end of the post which causes its inner end 160 to turn in the direction 158 to tilt up the radially outer portion 168 of the optical element 152. A plurality of such actuators is spaced about the periphery of the optical element, to tilt up a ring-shaped area at the edge of the optical element that had a roll-off near its edge. FIG. 11 illustrates another actuator 170 wherein the piezoelectric actuator element 172 is positioned to apply torque in a direction 174 opposite to the piezoelectric element 162.

FIG. 12 illustrates another system, wherein the deformable optical element 182 is located along a test arm or path 184 of the system, along which a light component 186 passes, which reflects off the workpiece element 188. A reference optical element 190 is a nondeformable mirror. The deformable device 192 which includes the deformable element 182, is similar to the deformable device 120 of FIG. 8, in that it includes a substantially flat element which can be manufactured at a relatively low cost (although a curved deformable element could be used here).

The terms "light" herein includes electromagnetic radiation of any frequency, and the term "optical element" includes an element which acts in accordance with such light. The invention can be used for wavelengths far from the visible, as in testing a radar dish antenna. The present invention can be used to compare the reflective and refractive properties of acoustic devices, where the interaction of an acoustic test element with acoustic radiation is to be compared with the interaction of a test acoustic element with acoustic radiation. The same setup, using a deformable acoustic test element instead of an optical test element, can be used.

Thus, the invention provides systems for measuring the surface of a workpiece optical device or element by comparing that surface to a reference surface, which facilitates such measurements especially where the workpiece surface is highly aspheric. A deformable element (which may be the reference optical device or an auxiliary device) is position along the reference path or the test path. The deformable element can be distorted in a controlled manner, while a fringe pattern is produced, to produce a fringe pattern that can be more easily analyzed than if the deformable element were not deformed.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for measuring the reflective/refractive properties of an optical workpiece device comprising:
   a source of coherent light;
   means defining a fringe receiving surface;
   a reference optical device of known original configuration;
   means for supporting said workpiece device;
   means for generating two coherent light components of the same wavelength and a constant phase relationship and directing one component to said reference device and the other to said workpiece device, and for combining both components after each has interacted with a corresponding optical device, onto said fringe surface;
   electrically controllable means for deforming said reference device to a deformed contour that produces a fringe pattern on said fringe surface which has a lower maximum density of fringe lines than the fringe pattern on said fringe surface which exists when the deforming means does not deform the workpiece device, and for generating an output representing the deformation of said reference device in its deformed contour, whereby to enable a determination of the shape of the workpiece by the original reference device configuration, the deformation of it, and the fringe pattern obtained with the deformed reference element.

2. The apparatus described in claim 1 wherein:

said workpiece and reference devices are both reflectors, and said deforming means deforms said reference device, to more closely match the curvature of said workpiece device.

3. The apparatus described in claim 1 wherein:
said reference device comprises a reflector, and said workpiece device comprises a lens and a mirror on a side of said lens which is furthest from said means for generating.

4. The apparatus described in claim 1 wherein:
said reference optical device includes first and second reference reflectors, with the first reflector positioned to reflect light from said source to the second reflector and to reflect light from the second reflector to the fringe receiving surface, said controllable means being positioned to deform said reflector, whereby to increase the effect of a given distortion.

5. The apparatus described in claim 4 wherein:
said first reflector has a substantially flat reflecting surface, whereby to minimize the cost of the deformable reflector.

6. In an optical testing system which includes means for splitting a coherent light beam into two components, directing one component at an optical workpiece element that is to be tested and the other at an optical reference element, and combining the components on a single fringe surface after they have encountered both elements, the improvement wherein:
said reference element is deformable; and including means for controllably deforming said reference element to a shape which produces fewer and straighter fringes on said fringe surface than before deformation.

7. The improvement described in claim 6 wherein:
said reference element comprises a mount, a reflector having a reflective front surface and a rear surface, a plurality of piezoelectric actuators coupling said mount to a plurality of different areas on said back surface of said reflector, and means for applying a separately controllable voltage to each piezoelectric actuator and generating an indication of the voltage applied to each actuator.

8. The improvement described in claim 6 wherein:
said means for deforming includes a plurality of actuators coupled to locations on said reference elements that are arranged in substantially a ring, said actuators being energizable to apply torque to each of said locations, whereby to change the radius of curvature of a ring-shaped region of the reference element.

9. In an optical testing system which includes means for splitting a coherent light beam into two components, directing a first component along a test path to an optical workpiece element that is to be tested and the other along a reference path to an optical reference element, and combining the components on a single fringe surface after they have encountered both elements, the improvement comprising:
a deformable optical element positioned along said test path to interact with the first light beam component which encounters said first workpiece element; and
means for controllably deforming said deformable element to a shape which produces fewer and straighter fringes on said fringe surface than before deformation.

10. The improvement described in claim 9 wherein:
said deformable element comprises a substantially flat reflector.

11. A method for determining the shape of an optical device to be tested comprising:
splitting coherent light into two components;
directing one component at said device to be tested and the other component at a reference optical device;
combining said components, after they have reached the respective devices, onto a fringe surface;
deforming said reference device in a known amount to more closely match said device to be tested, whereby to provide a fringe pattern on said fringe surface which has a reduced maximum density of fringe lines.

12. The method described in claim 11 wherein:
both of said devices are reflectors that have a reflective surface;
said steps of directing and combining include passing the light into a beamsplitter, reflecting each component of the light from a corresponding reflector back to the beamsplitter and directing both components from the beamsplitter to said fringe surface;
said step of deforming said reference reflector device including coupling a plurality of different areas on a back surface thereof which is opposite the reflective surface, to a mount, through a different one of a plurality of piezoelectric transducers, and applying a controlled voltage to each of said transducers.

13. The method described in claim 12 wherein:
said reference device is a reflector, and said element to be tested comprises a lens and a flat mirror located to reflect light passing through the lens back through the lens to said fringe surface.

14. In a method for determining the shape of a workpiece optical device to be tested by splitting coherent light into two components, directing one component along a test leg at said workpiece device and the other component along a reference leg at the reference optical device, and then combining the components on a fringe surface to form a fringe pattern thereon, the improvement comprising:
directing a light component moving along one of said legs against a deformable optical element prior to combining said components; and
deforming said deformable element to a shape which produces an easier-to-interpret fringe pattern than before said element was deformed, said easier-to-interpret fringe pattern having a smaller variation in density of fringe lines than before said element was deformed.

15. The method described in claim 14 wherein:
said step of directing a light component against a deformable element includes establishing a substantially flat reflector along one of said legs and directing a light component against its substantially flat reflective surface.

16. Apparatus for measuring the reflective/refractive properties of a workpiece which interacts with certain radiation comprising:
a source of coherent radiation;
means defining a fringe receiving surface;
a reference device of known original configuration which interacts with said radiation;
means for supporting said workpiece device;
means for generating two coherent components of said coherent radiation where the components are of the same wavelength and a constant phase relationship, and directing one component to said reference device and the other to said workpiece device, and for combining both components after each has interacted with a corresponding device, onto said fringe surface;

electrically controllable means for deforming said reference device to a deformed contour that produces a fringe pattern on said fringe surface which has fringe lines of a more uniform radius of curvature than the fringe pattern on said fringe surface which exists when the deforming means does not deform the workpiece device, and for generating an output representing the deformation of said reference device in its deformed contour, whereby to enable a determination of the shape of the workpiece by the original reference device configuration, the deformation of it, and the fringe pattern obtained with the deformed reference element.

17. The apparatus described in claim 16 wherein:
said workpiece and reference devices are both reflectors, and said deforming means deforms said reference device to more closely match the curvature of said workpiece device.

18. Apparatus for measuring the reflective refractive properties of an optical workpiece device comprising:
a source of coherent light;
means defining a fringe receiving surface;
a reference optical device of known original configuration;
means for supporting said workpiece device;
means for generating two coherent light components of the same wavelength and a constant phase relationship and directing one component to said reference device and the ohter to said workpiece device, and for combining both components after each has interacted with a corresponding optical device, onto said fringe surface;
electrically controllable means for deforming said reference device to a deformed contour that produces a fringe pattern on said fringe surface wherein the fringe lines have a more uniform radius of curvature than in the fringe pattern on said fringe surface which exists when the deforming means does not deform the workpiece device, and for generating an output representing the deformation of said reference device in its deformed contour, whereby to enable a determination of the shape of the workpiece by the original reference device configuration, the deformation of it, and the fringe pattern obtained with the deformed reference element.

19. The apparatus described in claim 18 wherein:
said workpiece and reference devices are both reflectors, and said deforming means deforms said reference device, to more closely match the curvature of said workpiece device.

20. A method for determining the shape of an optical device to be tested comprising:
splitting coherent light into two components;
directing one component at said device to be tested and the other component at a reference optical device;
combining said components, after they have reached the respective devices, onto a fringe surface;
deforming said reference device in a known amount to more closely match said device to be tested, to provide a fringe pattern on said fringe surface wherein the fringe lines have a more uniform radius of curvature.

21. The method described in claim 20 wherein:
both of said devices are reflectors that have a reflective surface;
said steps of directing and combining include passing the light into a beamsplitter, reflecting each component of the light from a corresponding reflector back to the beamsplitter and directing both components from the beamsplitter to said fringe surface;
said step of deforming said reference reflector device including coupling a plurality of different areas on a back surface thereof which is opposite the reflective surface, to a mount, through a different one of a plurality of piezoelectric transducers, and applying a controlled voltage to each of said transducers.

22. The method described in claim 20 wherein:
said reference device is a reflector, and said element to be tested comprises a lens and a flat mirror located to reflect light passing through the lens back through the lens to said fringe surface.

* * * * *